United States Patent Office 2,950,504
Patented Aug. 30, 1960

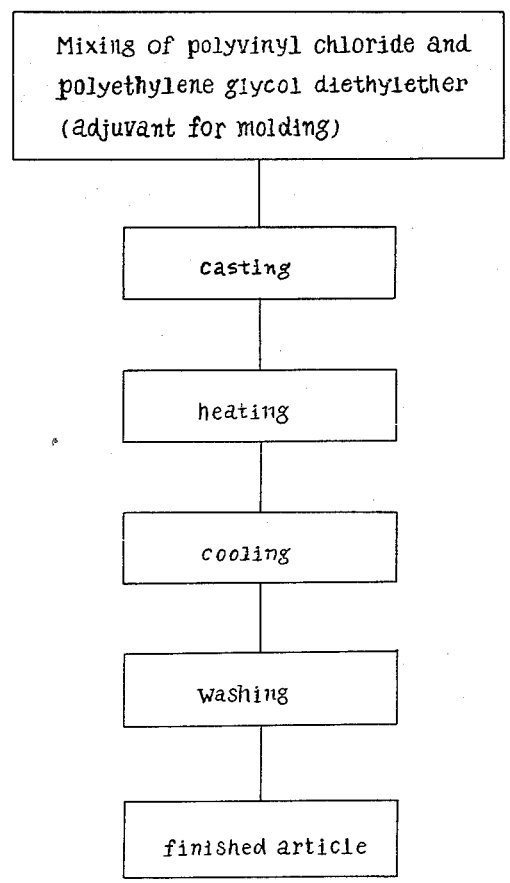

2,950,504
PROCESS FOR MOLDING HARD POLYVINYL CHLORIDE

Shigemasa Suzuki, 68 Kitanokiri, Shimo-no-Issiki-cho, Nakagawa-ku, Nagoya, Aichi, Japan Filed May 20, 1957, Ser. No. 660,045

9 Claims. (Cl. 18—58)

This invention relates to a process for molding hard polyvinyl chloride using a solution containing the same.

In the prior art processes of molding hard polyvinyl chloride using machines an increase in difficulties is encountered. This is particularly so when a requirement for greater mechanical strength rather than for the production of soft molded materials is to be satisfied. When polyvinyl chloride having a high degree of polymerization and a high softening point is used in the molding operation an extreme decrease in production results. It is also very troublesome to mold hard polyvinyl chloride in solution. From a technical point of view as well as from a managerial viewpoint this is almost impossible in theory as well as in practice.

One solution to the above-mentioned problems has been suggested by Japanese patent publication No. 1,092/1955. According to this patent the plasticizer contained in the polyvinyl chloride product is extracted with solvents such as alcohol, gasoline, ether and benzene. The essential point of novelty of the invention in this Japanese patent is the brief extraction of the water-insoluble plasticizer with a solvent other than water.

The present invention involves mixing polyvinyl chloride including a stabilizer and coloring matter and filler with a water-soluble liquid compound possessing the optimum ability to form a sol of polyvinyl chloride and to facilitate the formation of a gel composition therefrom. This material is defined herein as an adjuvant for molding and includes such materials as glycerin diacetate, polyethylene glycol monostearate and tetraethylene glycol diethylether selected from the class consisting of glycerin or glycol compounds or ester or ether compounds thereof. A paste of latex is formed which is then subjected to a processing operation such as flow-stretching, immersing or casting, to form gel composition. Thereafter the adjuvant for molding is removed by immersing into water or spraying. As will be seen from the aforementioned description the method of this invention differs fundamentally from the method described in Japanese patent publication No. 1092/1955. In the latter the adjuvant for molding, being water-soluble, does not function as the plasticizer for polyvinyl chloride and removal of the adjuvant for molding is done without the direct object of setting the polyvinyl chloride.

As a rule, no plasticizer is used in this invention. However, when a slight elasticity is required depending on the use of the product, a small amount of plasticizer is incorporated to form the gel composition and thereafter the adjuvant for molding is washed out with water. In this instance, it is enough to merely allow the gel forming composition to stand in water for 1 to 10 minutes because the product may be set when it acquires the desired elasticity, the plasticizer remaining incorporated therein.

The adjuvant for molding that has been washed out with water may be separated from water by intersolubility in water, differences in boiling point or in freezing point or the like if one wishes to recover it for further use.

In the prior art production of sheet or film of hard polyvinyl chloride was necessary to carry out a further press processing step with a roll because of the need for preparing the surface. Furthermore, it has been difficult molding a resin of a high degree of polymerization having a high softening point, this being restricted by limits of efficiency, mechanical strength, molding temperature and the like. Moreover, according to the prior art in extrusion, injection or other similar type molding processes only products of thick grades may be produced so that the range of the products is narrow and the production is small from the technical or management point of view.

It is now possible in accordance with the present invention to solve all problems mentioned above. This is so since the present invention employs a solution in the molding operation and operates without pressure. Furthermore, it is possible according to the present invention to provide a hard polyvinyl chloride having excellent properties such as flame, water and reagent resistance for use in place of previously used Celluloid or cellophane. It is also possible thereby to increase production as well as to improve quality because of the simple installation needed and the ease of operation. Sheet or film of hard polyvinyl chloride may be produced by using a continuous process, and hollow products, tubes, vessels or molded materials can be made by dip or cast molding. The process according to this invention is therefore suitable preferably for the production of products of thin grade.

No solvent is used in the process according to this invention so that it is unnecessary to recover the solvent, or sustain losses thereof in recovering or to take precautions against flammability, toxicity and the like of the solvent. In this connection it is further possible to avoid increases in costs of installation and to simplify operations in various steps.

A further advantage of the process of this invention is that the water employed does not influence the polyvinyl chloride and it is readily available. It has no influence upon appearance or quality of the polyvinyl chloride to be hardened nor upon the materials incorporated therein such as stabilizer, coloring matter and filler.

In the accompanying drawing the single figure is a flow diagram illustrating the sequence of steps involved in the present invention.

The following examples are further illustrative of the invention.

*Example 1*

Into 100 parts of polyvinyl chloride (degree of polymerization 1400) are incorporated 100 parts of polyethylene glycol diethylether (adjuvant for molding), 1 part of stabilizer, 0.5 part of lubricant and 2 parts each of coloring matter, filler and plasticizer to give a paste with a paint roll. The liquid described above is attached to and flow-stretched on the outside of lower part of an endless belt plated on the outside and provided with cooling water at 40° C. in the inside of lower part and a molding furnace in the inside of upper part. A gel composition is gradually formed as the belt rotates and the product forming gel composition is discharged from the belt at the cooling part followed by dipping into water for 1 to 10 minutes. The adjuvant for molding is removed by running water with stirring to obtain sheet of hard polyvinyl chloride.

*Example 2*

The liquid formed as described in Example 1 is mixed with 8 parts of water and dispersed to give a latex.

A desired mold is dipped into the solution described above and the excessive solution is removed. The mold is heated in a first molding furnace at 90° C. for 5 minutes followed by heating in a second molding furnace at 180° C. for 5 minutes to form a gel composition. The resultant mass is then poured into water with stirring. The last step is carried out either after taking off the mold or when the mold is still attached to wash out the adjuvant from the molding composition. Shaped materials of hard polyvinyl chloride such as cups or tubes are thus obtained.

Having now described the invention, what is claimed as new and desired to be secured by Letters Patent is:

1. A process for molding hard polyvinyl chloride resins of high degree of polymerization and having a high softening point which comprises forming a fluid suspension of said resin in a fluid medium containing a water soluble liquid molding adjuvant selected from the group of compounds consisting of glycerin diacetate, polyethylene glycol monostearates and polyethylene glycol diethylethers, applying said fluid suspension to a molding surface, heating said fluid suspension to cause it to jell while in position on said molding surface, washing said jelled suspension with water to remove said molding adjuvant, thus forming a hard polyvinyl chloride resin article conforming to said molding surface.

2. A process for molding hard polyvinyl chloride resins having a molecular weight of about 1400 and a high softening point which comprises forming a fluid suspension consisting essentially of 100 parts by weight of said polyvinyl chloride resin, 100 parts by weight of polyethylene glycol diethylether, 1 part by weight of stabilizer, 0.5 part by weight of lubricant and 2 parts by weight of each of coloring matter, filler and plasticizer whereby a paste is formed, flowing said paste onto an endless belt molding surface, heating said paste to cause it to jell while disposed on said molding surface, dipping said jelled product in water for from 1–10 minutes and washing said polyethylene glycol diethylether from said product with water.

3. A process for molding hard polyvinyl chloride resins having a molecular weight of about 1400 which comprises forming a paste consisting essentially of 100 parts by weight of said polyvinyl chloride resin, 100 parts by weight of said polyethylene glycol diethylether as molding adjuvant, 1 part by weight of stabilizer, 0.5 part by weight of lubricant and 2 parts by weight of each coloring matter, filler and plasticizer, mixing said paste with 8 parts by weight of water to form a latex solution, dipping a mold into said latex solution whereby a coating is formed on said mold, heating said mold containing said coating at a temperature of 90° C. for five minutes, subjecting the coated mold so treated to a second heating operation at 100° C. for five minutes whereby said coating is caused to jell, washing said jelled material with water to remove said molding adjuvant whereby a shaped, hard polyvinyl chloride resin object is formed.

4. A process for molding hard polyvinyl chloride resins as claimed in claim 1 wherein said fluid suspension comprises a paste including stabilizer, coloring matter and filler.

5. A process according to claim 4 wherein said fluid suspension also includes a plasticizer for said resin.

6. A process for molding hard polyvinyl chloride as claimed in claim 1, wherein at least one of said adjuvants comprises glycerine diacetate.

7. A process for molding hard polyvinyl chloride as claimed in claim 1, wherein said adjuvants comprise polyethylene glycol monostearate.

8. A process for molding hard polyvinyl chloride as claimed in claim 1, wherein said adjuvants comprise tetraethylene glycol diethylether.

9. A process according to claim 1, wherein said fluid suspension is in the form of a paste and said molding adjuvant is polyethylene glycol diethylether.

References Cited in the file of this patent
UNITED STATES PATENTS

| | | |
|---|---|---|
| 2,245,708 | Patton | June 17, 1941 |
| 2,563,644 | Drisch et al. | Aug. 7, 1951 |
| 2,566,205 | Hunn | Aug. 28, 1951 |
| 2,674,585 | Condo et al. | Apr. 6, 1954 |
| 2,686,168 | Reid et al. | Aug. 10, 1954 |
| 2,751,629 | Dick | June 26, 1956 |